United States Patent [19]

Okamoto et al.

[11] Patent Number: 4,997,360
[45] Date of Patent: Mar. 5, 1991

[54] APPARATUS FOR MANUFACTURING HEAT-SHRINKABLE RESIN TUBE

[75] Inventors: Tatsuo Okamoto; Tatsuya Horioka, both of Osaka, Japan

[73] Assignee: Sumitomo Electric Industries, Ltd., Osaka, Japan

[21] Appl. No.: 341,999

[22] Filed: Apr. 20, 1989

[30] Foreign Application Priority Data

Apr. 23, 1988 [JP] Japan .................................. 63-100673
Mar. 7, 1989 [JP] Japan ...................................... 1-55400

[51] Int. Cl.⁵ ..................... B29C 49/16; B29C 49/28; B29C 49/64
[52] U.S. Cl. ..................................... 425/384; 425/388
[58] Field of Search ........................ 425/67, 68, 70, 71, 425/388, 387.1, 378.1, 384; 264/568

[56] References Cited

U.S. PATENT DOCUMENTS

| | | |
|---|---|---|
| 3,187,383 | 6/1965 | Bacchus et al. ............... 425/67 |
| 3,248,463 | 4/1966 | Wiley et al. ..................... 264/568 |
| 3,327,030 | 6/1967 | Reifenhauser ................ 264/568 |
| 3,370,112 | 2/1968 | Wray ................................ 425/71 |
| 3,539,670 | 11/1970 | Hall ................................. 425/71 |
| 3,541,189 | 11/1970 | Yoshikawa et al. ............. 425/71 |
| 3,546,745 | 12/1970 | Ball ................................. 425/71 |
| 3,717,426 | 2/1973 | Tucking et al. ................. 425/71 |
| 3,812,230 | 5/1974 | Takahashi ..................... 264/568 |
| 3,821,349 | 6/1974 | Mozer .............................. 425/71 |
| 4,029,452 | 6/1977 | Schippers et al. .............. 425/71 |
| 4,530,650 | 7/1985 | Milani ............................. 425/71 |
| 4,543,051 | 9/1985 | Maillefer ...................... 425/388 |
| 4,575,326 | 3/1986 | French ........................... 425/71 |
| 4,740,146 | 4/1988 | Angelbeck ...................... 425/71 |

FOREIGN PATENT DOCUMENTS 3009531 1/1988 Japan ................................ 264/568

*Primary Examiner*—Willard E. Hoag
*Attorney, Agent, or Firm*—Armstrong, Nikaido Marmelstein, Kubovcik & Murray

[57] ABSTRACT

An apparatus for manufacturing a heat-shrinkable tube has a die formed with a center bore through which a resin tube passes and a plurality of radial holes extending from the bore to the outer periphery of the die. The die is contained in a tank filled with a cooling fluid so that the die will be immersed in the cooling fluid. The interior of the tank is kept under reduced pressure. At the inlet side of the die, a pre-cooling unit is provided which supplies a cooling fluid to the outer periphery of a resin tube which have been heated to a temperature above its softening point beforehand. The tube is expanded at least by the suction force applied thereto while passing through the die kept under reduced pressure. The cooling fluid in the tank and that supplied from the pre-cooling unit serve to reduce the friction between the tube and the inner periphery of the die, thus preventing the tube from expanding lengthwise. A jacket may be provided around the die to supply the cooling fluid.

3 Claims, 1 Drawing Sheet

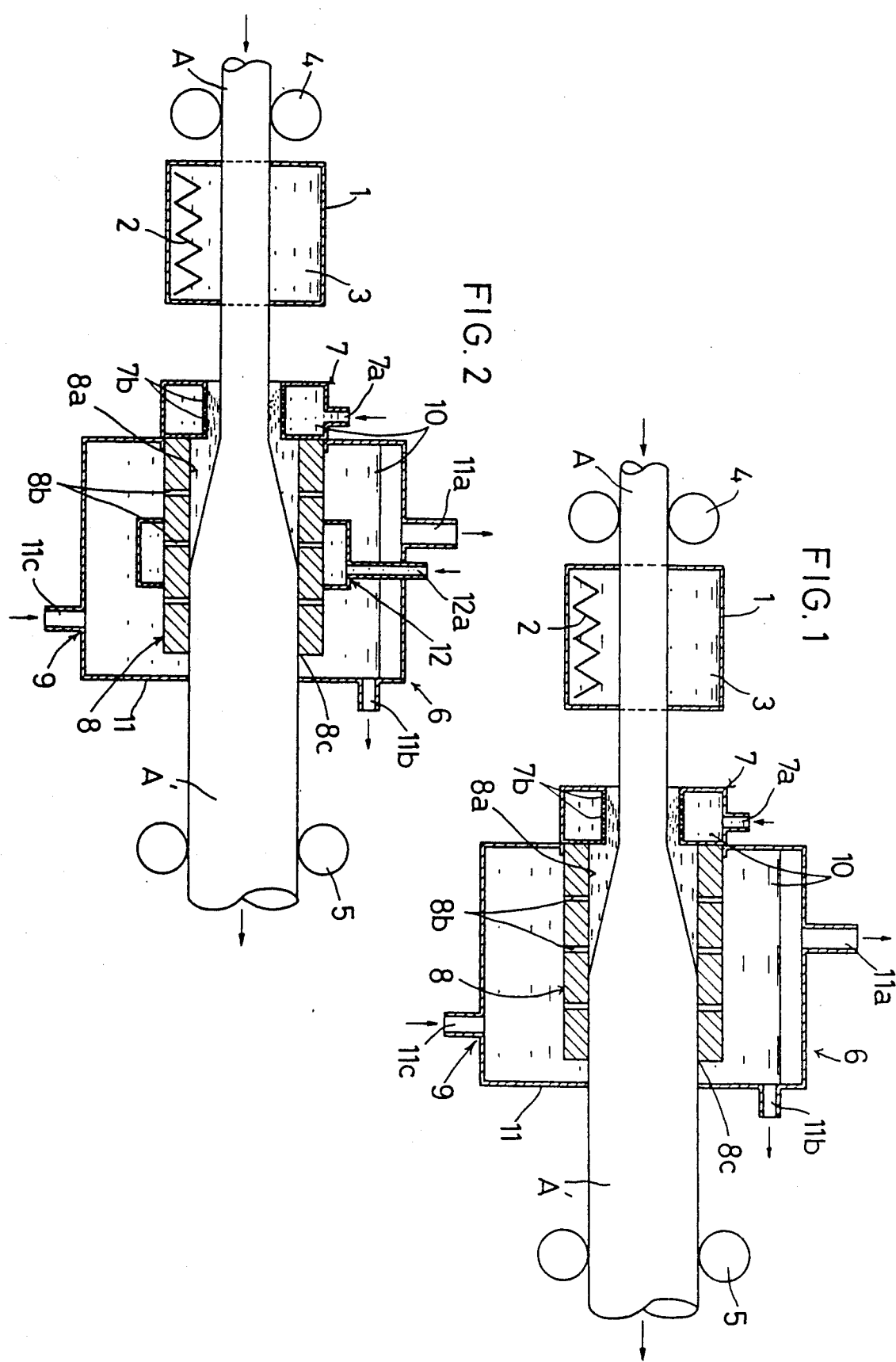

APPARATUS FOR MANUFACTURING HEAT-SHRINKABLE RESIN TUBE

The present invention relates to an apparatus for manufacturing a heat-shrinkable resin tube by expansion while limiting the expansion in the longitudinal direction to a minimum.

The apparatus for producing a heat-shrinkable tube is roughly classified into a batch type and a continuous type. Since batch type ones are poor in efficiency and yield, continuous type ones are more widely used nowadays. On the latter type, resin tube is continuously formed by expansion into a heat-shrinkable tube while being fed.

As disclosed in U.S. Pat. No. 3,370,112, Japanese Patent Publication No. 55-6045 and Japanese Unexamined Patent Publication No. 60-187531, a prior art continuous type apparatus comprises a heating tank or pipe for heating a resin tube to a temperature above the softening point, a pressure reduction tank or a sizing die for expanding the heated tube until it touches the inner wall of a molding pipe or die. The expanded tube is cooled and kept as it is.

With such a prior art apparatus, a resin tube tends to expand considerably in the longitudinal direction by the friction with the die. The tube thus expanded will shrink in the longitudinal direction when heated thereafter. This will lower its commercial value.

The higher the feed rate of the tube, the larger the expansion of the tube in the longitudinal direction will be. Thus, the feed rate was limited to a low speed about within 2-10 m/min. This will result in poor working efficiency.

Japanese Unexamined Patent Publication No. 60-187531 discloses an apparatus having a molding die made of a porous material through which a refrigerant is supplied to a tube expanded by heating. With this arrangement, the tube can be cooled effectively and the friction between the tube and the die is reduced. But the abovesaid problem is not fully solved.

It is an object of the present invention to provide an apparatus for producing a heat-shrinkable tube which obviates the abovesaid shortcomings.

In accordance with the present invention, there is provided an apparatus for manufacturing a heat-shrinkable resin tube, comprising a heating means for heating the resin tube to a temperature above its softening point; a precooling means for supplying a cooling fluid to the outer periphery of the resin tube heated by the heating means; a pressure reducing/cooling means having a tank filled with a cooling fluid; the tank being kept under reduced pressure; and a die mounted in the tank and immersed in the cooling fluid; the die being formed with a center bore through which the resin tube fed from the pre-cooling means passes and with a plurality of radial holes extending from the center bore to the outer periphery of the die; whereby continuously expanding the resin tube with a suction force applied thereto and forming it with the die while passing it through the center bore of the die kept under reduced pressure and cooling it by the action of the cooling fluid from the precooling means which flows into the tank through the center bore and the radial holes and the cooling fluid in the tank.

The cooling fluid supplied from the pre-cooling unit or from both the pre-cooling unit and the jacket serves to lubricate the contact surface between the die and the resin tube while flowing therebetween. Thus, the resin tube can pass through the die with a substantially decreased frictional resistance which will otherwise cause the tube to be expanded in the longitudinal direction.

Since the bore in the die is in communication through the holes in the wall of the die with the tank in the pressure reducing/cooling unit kept under reduced pressure, the resin tube is put under reduced pressure so as to be sucked to expand. The cooling fluid also serves as a seal to keep the interior of the tank under vacuum. This will allow the tube to be expanded more stably. Also, since a larger suction force can be applied to the tube, the working efficiency will be improved.

The cooling fluid supplied to the tube before it is introduced into the die will be replaced with the cooling fluid in the tank while passing through the die, thus allowing the tube to be cooled effectively while subjected to expansion.

A resin tube has heretofore been cooled not before expansion but after expansion because it has been believed that cooling the tube before expansion would cause such problems as insufficient expansion or uneven wall thickness of the tube. According to the present invention, the feed rate of the cooling fluid from the pre-cooling unit is controlled with the heat transfer rate of the tube taken into consideration, so that the tube will be kept at a temperature above its softening point before expansion and will be cooled gradually while being subjected to expansion to a temperature below the softening point by the end of the expansion step. This will prevent insufficient expansion or an uneven wall thickness of the tube.

The cooling fluid in the jacket, which is distributed through the holes in the wall of the die into its bore, also serves to enhance the tube cooling effect. This arrangement is especially effective when expanding a large-diameter tube at a high speed.

The cooling fluid in the tank of the pressure reducing-/cooling unit might experience a gradual rise in temperature if the apparatus is operated continuously for long hours at a high speed. To prevent this, the cooling fluid may be fed into the tank forcibly from any other source than the pre-cooling unit or the jacket.

The apparatus according to the present invention can produce at a high speed a high-quality heat-shrinkable tube while keeping the expansion in the longitudinal direction to a minimum. This will be apparent from the results of the experiments shown below.

The working efficiency will be improved further if the internal pressure of the tube is increased while the tube is being expanded. This means that the tube may be expanded not only by a suction force but also by increasing the internal pressure of the tube.

With a prior art apparatus of this type, a large-diameter tube could not be fed at a speed of more than several meters per minute because of a large friction with the die due to a large surface area of the tube and because of a low cooling rate. According to the present invention, a cooling fluid is supplied to the tube at the intermediate portion of the die to improve the cooling effect as well as lubricating effect. Thus a large-diameter tube can be fed at a considerably high speed.

As a result, the tube production cost is reduced to a minimum. Further, it is not necesary to allow for longitudinal shrinkage of the tube when reheating. This will improve the working efficiency to a great degree and allow the tube to be produced less expensively.

Other features and objects of the present invention will become apparent from the following description taken with reference to the accompanying drawings, in which:

FIG. 1 is a sectional view of the first embodiment of the present invention, and FIG. 2 is a similar view of the second embodiment.

Now referring to FIG. 1, an apparatus according to the present invention comprises a heating tank 1 containing a heater 2 and a heating medium 3 where a resin tube A is heated to a temperature above the softening point, supply rollers 4 for the resin tube A, take-up rollers 5 for a heat-shrinkable tube A' made from the tube A, and an expansion molding unit 6 which characterises the present invention. The molding unit 6 comprises a pre-cooling unit 7, a die 8 and a pressure reducing/cooling unit 9.

The pre-cooling unit 7 is provided at the inlet side of the die 8 and is in the form of an annular chamber adapted to surround the resin tube A. It is provided with an inlet port 7a through which a cooling fluid 10 is supplied continuously into the chamber. The cooling fluid in the chamber is adapted to be discharged against the outer periphery of the resin tube A through radial holes 7b formed in the inner periphery of the annular chamber.

The die 8 has a center bore 8a through which the resin tube A passes and is formed with a plurality of radial through holes 8b extending from the bore 8a to the outer periphery of the die 8. The bore 8a has its outlet side 8c open to the inside of a pressure reduction tank 11. The through holes 8b should have a small diameter and be formed uniformly over the entire circumference of the die 8 so as to apply a suction force to the resin tube A uniformly over its entire circumference.

The pressure reducing/cooling unit 9 comprises the pressure reduction tank 11 surrounding the die 8 and containing a cooling fluid 10. The tank 11 has a vacuum port 11a through which a vacuum is normally applied to the interior of the tank 11. Thereby, the liquid 10, which has absorbed the heat of the resin tube, is discharged out of the tank through a liquid outlet 11b. If the temperature of the cooling fluid 10 rises, a fresh liquid has to be fed into the tank through a supply port 11c. The cooling fluid discharged from the port 11b is cooled in a refrigerator (not shown) and returned into the tank 11 and the precooling unit 7.

As shown in FIG. 2, a jacket 12 may be mounted around the intermediate portion of the die 8 to supply the cooling fluid 10 continuously toward the tube A through its supply port 12a. The cooling fluid in the jacket 12 is then discharged into the bore 8a through some of the holes 8b formed in the die 8. The cooling fluid 10 should be fed into the jacket 12 by means of e.g. a pump. The cooling rate of the tube can be controlled by adjusting the feed rate of the cooling fluid.

We made tubes by use of the apparatus according to the present invention. The experiment results are shown below.

EXPERIMENT 1

A tube used in this experiment is 1 mm in the inner diameter and 0.45–0.5 mm in wall thickness and made of polyethylene crosslinked by electron radiation.

The heating tank 1 was filled with ethylene glycol solution. The liquid was heated by a heater 2 to 150°–160° C.

Pressurized air was introduced into the resin tube A from one end thereof with the other end sealed until the internal pressure reached 0.4–0.5 kg/cm$^2$. This resin tube A was passed through the heating tank 1 to heat it and then introduced from its leading end into the pre-cooling unit 7 and the die 8. The cooling fluid 10 at 0C. was supplied from the pre-cooling unit 7 through the holes 7b at the rate of 480 cc/min. The power of a vacuum pump was set so that the degree of vacuum in the tank 11 will be 650–700 mmHg. As the cooling fluid 10, an antifreezing mixture of water and ethylene glycol was used.

The resin tube A was fed into the apparatus at the rate of 55 meters per minute by the rollers 4. The tube A' thus expanded was drawn out at the rate of 50 meters per minute by the rollers 5.

The resulting heat-shrinkable tube A' was 3 mm in the inner diameter and 0.2–0.3 mm in the wall thickness. When the tube A' was subjected to heat shrinkage by heating it to 125 C., its inner diameter and wall thickness changed to 1.2 mm and 0.5–0.55 mm, respectively. But its length changed scarcely after heating. Namely, the length after heating was 99–100 mm with respect to 100 mm before heating.

EXPERIMENT 2

A tube used in this experiment is 9 mm in the inner diameter and 0.75–0.8 mm in the wall thickness and made of polyethylene crosslinked by electron radiation. The heating tank 1 was filled with glycerine solution, which was heated to 150–160 C. by the heater 2.

Pressurized air was introduced into the tube same manner as in EXPERIMENT 1 until its internal pressure rised to 0.01 kg/cm$^2$. The tube was heated in the heating tank 1 and then fed into and drawn out of the pre-cooling unit 7 and the die 8 from its leading end.

From the pre-cooling unit 7, an antifreezing mixture of water and glycerine, was supplied at the rate of 150 cc per minute. The degree of vacuum in the tank 11 was adjusted to 400–450 mmHg.

The resin tube A was fed into the apparatus at the rate of 21 meters per minute by the rollers 4. The tube A' thus expanded was drawn out at the rate of 20 meters per minute.

The resulting heat-shrinkable tube A' was 21 mm in the inner diameter and 0.35–0.45 mm in the wall thickness. When the tube A' was subjected to heat shrinkage by heating it to 125 C., its inner diameter and wall thickness changed to 9.1 mm and 0.8–0.9 mm, respectively. But its length changed scarcely after heating. Namely, the tendency of the tube to be stretched lengthwise during expansion is kept very small as with the tube made in EXPERIMENT 1.

EXPERIMENT 3

A tube used in this experiment is made of polyolefin crosslinked by electron radiation and has an inner diameter of 11.3 mm and a wall thickness of 0.9–0.95 mm.

The heating tank 1 of the apparatus shown in FIG. 2 was filled with ethylene glycol solution which was heated to 150– 160 C. by the heater 2.

Pressurized air was injected into the tube from one end thereof with the other end sealed until its internal pressure rised to 0.01–0.02 kg/cm$^2$. The tube was passed through the heating tank 1 to heat it. Then it was introduced from its leading end into the pre-cooling unit 7 and the die 8. The cooling fluid kept at 0° C. was supplied from the pre-cooling unit 7 at the rate of 500 cc/min. The cooling fluid 10 kept at 0° C. was also supplied into the jacket 12 at the rate of 2000 cc/min. The power of the vacuum pump was set so that the degree of vacuum in the tank 11 will be 650–700 mmHg. As the cooling fluid, a mixture of water and ethylene glycol was used.

The resin tube A was fed into the apparatus at the rate of 21.9 meters per minute. The tube A' thus expanded was drawn out of it at the rate of 20 meters per minute.

The resulting heat-shrinkable tube A' was 26.7 mm in the inner diameter and 0.37–0.50 mm in the wall thickness. Then the tube A' was subjected to heat shrinkage by heating it to 125 C. The tube thus made was 11.5 mm in the inner diameter and 0.9–1.0 mm in the wall thickness. Its length after heating was 99–100 mm with respect to a unit length before heating of 100 mm. This means that the tube scarcely underwent a change of length by heating.

What is claimed is:

1. An apparatus for manufacturing a heatshrinkable resin tube, comprising a heating means for heating the resin tube to a temperature above its softening point; a pressure reducing/cooling means having a tank filled with a cooling fluid; said tank including means to apply sub-atmospheric pressure to radially expand said resin tube; a die mounted in said tank and immersed in said cooling fluid; said die being formed with a center bore through which said resin tube passes and forming an outer surface of said radially expanded resin tube, said die having a plurality of radial holes extending from said center bore to the outer periphery of said die; a pre-cooling means located between said heating means said tank and having a center opening through which said heated resin tube passes to said center bore, said pre-cooling means having a fluid inlet port and outlet ports supplying a cooling fluid to the outer periphery of said heated resin tube passing through said center opening; and fluid passage means between said center opening of said pre-cooling means and said center bore of said die permitting cooling fluid flow from said pre-cooling means through said center bore and said radial holes to said tank with said cooling fluid partly cooling said heated resin tube before it is radially expanded internally of said die, lubricating the outer periphery of said resin tube as it is formed by said center bore of said die and providing a seal to maintain said tank under reduced pressure.

2. An apparatus as claimed in claim 1, further comprising means for applying a pressure internally of the resin tube.

3. An apparatus as claimed in claim 1, further comprising a jacket mounted around the outer periphery of said die to cover at least one of said radial holes, and means for supplying the cooling fluid from outside said tank through said jacket, said one of said radial holes, and said center bore into said tank.

* * * * *